United States Patent
Terashima (10) Patent No.: US 8,279,919 B2
(45) Date of Patent: Oct. 2, 2012

(54) IMAGE PROCESSING APPARATUS (75) Inventor: Kazuaki Terashima, Tokyo (JP)

(73) Assignee: Renesas Electronics Corporation, Kanagawa (JP)

(*) Notice: Subject to any disclaimer, the term of this patent is extended or adjusted under 35 U.S.C. 154(b) by 534 days.

(21) Appl. No.: 12/484,577

(22) Filed: Jun. 15, 2009

(65) Prior Publication Data

US 2010/0074322 A1 Mar. 25, 2010

(30) Foreign Application Priority Data

Sep. 25, 2008 (JP) .................................. 2008-245670

(51) Int. Cl.
*H04N 7/12* (2006.01)
*H04N 11/02* (2006.01)
*H04N 11/04* (2006.01)
*H04N 5/38* (2006.01)
*H04J 3/04* (2006.01)

(52) U.S. Cl. ......... 375/240.01; 375/240.12; 375/240.16; 375/240.25; 375/240.26; 348/445; 370/532

(58) Field of Classification Search ............... 375/240.01
See application file for complete search history.

(56) References Cited

U.S. PATENT DOCUMENTS

| | | | | |
|---|---|---|---|---|
| 4,672,443 | A * | 6/1987 | Dischert et al. | 348/445 |
| 7,245,661 | B2 * | 7/2007 | Kim et al. | 375/240.16 |
| 7,564,902 | B2 * | 7/2009 | Sasai et al. | 375/240.26 |
| 2001/0048721 | A1 * | 12/2001 | Kato | 375/240.25 |
| 2005/0100056 | A1 * | 5/2005 | Chuberre et al. | 370/532 |
| 2007/0104272 | A1 * | 5/2007 | He et al. | 375/240.12 |

FOREIGN PATENT DOCUMENTS

| | | |
|---|---|---|
| JP | 63-59082 A | 3/1988 |
| JP | 9-214957 | 8/1997 |
| JP | 2005 6275 A | 1/2005 |
| JP | 2007-6194 A | 1/2007 |
| JP | 2007-178851 A | 7/2007 |

OTHER PUBLICATIONS

Japanese Office Action, and English translation thereof, issued in Japanese Patent Application No. 2008-245670 dated Jun. 19, 2012.

* cited by examiner

*Primary Examiner* — Behrooz Senfi
*Assistant Examiner* — Hee-Yong Kim
(74) *Attorney, Agent, or Firm* — McDermott Will & Emery LLP (57) ABSTRACT

The invention is intended to reduce overall image degradation when frame interpolation is performed by means of an adaptive image compression technique. A compression unit which adaptively compresses input image data, determines an error rate, i.e., a quantity of data loss, depending on input image data. A compression rate is set, depending on the determined error rate (or the quantity of data loss). For an image that is likely to be degraded by compression because of a large error rate determined for it, a process of generating an interpolated image by an interpolated image generating unit is disabled and an original image is used instead of an interpolated frame.

3 Claims, 5 Drawing Sheets

|  | INTERPOLATION EXECUTED | NO INTERPOLATION EXECUTED |
|---|---|---|
| REQUIRED BANDWIDTH [BITS/FRAME] | 62,945,280 | 75,534,336 |
| CAPACITY [BITS] | 37,767,168 | 50,356,224 |
| COMPRESSION RATE | 2 | 1 |

: WXGA(1366×768)  ASSUMING 8 BITS FOR EACH OF R, G, & B  : D = TOTAL NUMBER OF BITS
= 25,178,112 BITS

FIG. 6

: One of the algorithms may be an algorithm with a compression rate of 1 and the selector 24 may select prescanned data as such.

IMAGE PROCESSING APPARATUS

CROSS-REFERENCE TO RELATED APPLICATIONS

The disclosure of Japanese Patent Application No. 2008-245670 filed on Sep. 25, 2008 including the specification, drawings and abstract is incorporated herein by reference in its entirety.

BACKGROUND OF THE INVENTION

The present invention relates to an image processing apparatus and, particularly, to a configuration of an image processing apparatus which generates an interpolated image by means of image compression processing in which an image is compressed for data amount reduction.

In image processing applications, it is required to process large amounts of data such as voice and video. To reduce data amounts when performing transfer of and storing of such image data into memory, image compression processing is performed. For image compression processing, a frame memory is generally used as a working area and image data of one or more frames are stored into this frame memory.

Meanwhile, along with recent trends toward visualizing higher definition images, for example, a full HD (High Definition image (High Vision image) with 1920×1080 pixels), there is a need for a double speed display or the like providing a higher image quality, which in turn increases the processing load. On the other hand, from a viewpoint of cost or the like, the storage capacity and bandwidth of a frame memory are finite and the processing speed and capacity of an operational processing device are limited. For efficient processing, it is hence required to distribute individual processes among limited resources.

For instance, the above-mentioned double speed technique is used to improve the response performance of a liquid crystal panel. The double speed technique multiples the number of frames by executing frame interpolation which generates another frame image from a plurality of frames. This technique multiplies the number of frames to be displayed on the liquid crystal panel and shortens a hold time which is intrinsic to the liquid crystal panel (the time during which a single frame image remains displayed thereon). Thus, the double speed technique suppresses a sense of persistence of vision and improves the response performance (Moving Picture Response Time: MPRT).

The frame interpolation in the case of double speed processing generates an intermediate image as an interpolated frame from two temporally successive frame images. It is needed to generate this interpolated frame within one vertical period (V). For high definition images having a very great number of pixels, it is thus required to increase the storage capacity and bandwidth of a frame memory. However, the bandwidth between the frame memory and its bus is system-specific. To increase an effective bandwidth, it becomes necessary to reduce the apparent amount of data. To reduce this amount of data, compression/decompression (expansion) processing is carried out. In the compression/decompression (expansion) processing, an adaptive compression may be performed which selectively use a compression processing scheme (algorithm) such as a compression rate depending on image features to achieve efficient image compression processing and thus to minimize degradation of image equality.

The amount of compressed data varies depending on the feature of the compressed image. After compression of, e.g., an image of a high granularity picture, the amount of the compressed data is greater, whereas, image compression of a white wall-like picture with less high range components produces a smaller amount of compressed data. In a case that the amount of compressed image data is very large, a situation may occur that compressed image data cannot be stored into a memory within a fixed processing period (vertical period). As a method for avoiding such situation, Patent Document 1 (Japanese Unexamined Patent Publication No. Hei 9 (1997)-214957) describes an configuration in which a process of estimating the amount of data after being compressed per field is performed. In the configuration described in Patent Document 1, before compression processing, image data is pre-scanned to determine its amount of data. According to this amount of data, quantized coefficients and encoding are configured so that compressed data will fall within a target data size, and an adaptive compression per field is performed.
[Patent Document 1]
Japanese Unexamined Patent Publication No. Hei 9 (1997)-214957

SUMMARY OF THE INVENTION

Since storing image data into a frame memory is done more than once during an image processing operation, image degradation after decompression (expansion) should be avoided as much as possible in the case of image compression processing to avoid accumulated image degradation. Lossless image compression (reversible image compression) ideally results in no degradation of image quality even if an image is compressed and expanded. However, in the case of lossless image compression processing, truncation of information is not allowed. Due to a lot of arithmetic operations entailed, the processing time becomes longer and high speed processing is needed to complete the arithmetic operations within a predetermined period of time. This poses a problem of increasing power consumption. To avoid this problem and to carry out high speed processing at low power consumption, truncating (quantizing) information to some degree has to be allowed. So, it is hard to generate a lossless image.

According to the above Patent Document 1, adaptive compression processing per field is performed, depending on data size. Specifically, even or odd fields are only pre-scanned and a compression rate is set (quantized coefficients and encoding are configured). By decreasing the number of times of setting a compression rate, the speed of reading data from a field memory (frame memory) is made higher than the speed of writing data to the memory. By thus increasing the pixel sampling speed, a higher horizontal resolution is intended. However, even in this Patent Document 1, a lossy image involving some noise is reproduced and it is hard to reproduce a lossless image. This is because the requirements of the specifications of the resources such as the frame memory and the operational processing device (compression/expansion unit) impose restrictions on the sampling speed, quantization and encoding processing.

Particularly when frame interpolation processing is performed for frame rate conversion, if a decompressed image is lossy, the resulting interpolated frame would have large noise and degradation of image quality is unavoidable. In Patent Document 1, there is no consideration for such a noise problem in images after being decompressed.

It is therefore an object of the invention to provide an image processing apparatus capable of reproducing an image with less degradation of image quality by simple circuit configuration.

In summary, the image processing apparatus according to the invention scans input image data, determines a quantity of data loss, and sets a compression rate depending on the determined quantity of data loss. When a certain threshold is exceeded, image data is not compressed without generating an interpolated frame and original image data is used instead of interpolated image data.

By selecting a compression rate depending on a quantity of image data loss, it is possible to reproduce an image with less noise, i.e., less degradation of image quality. Especially, when a large quantity of data loss is determined, original image data is used instead of an interpolated frame, so that a noisy interpolated frame is not generated. Noise (errors) can be concealed and overall image quality can be improved.

DETAILED DESCRIPTION OF THE PREFERRED EMBODIMENTS

Figure 1:
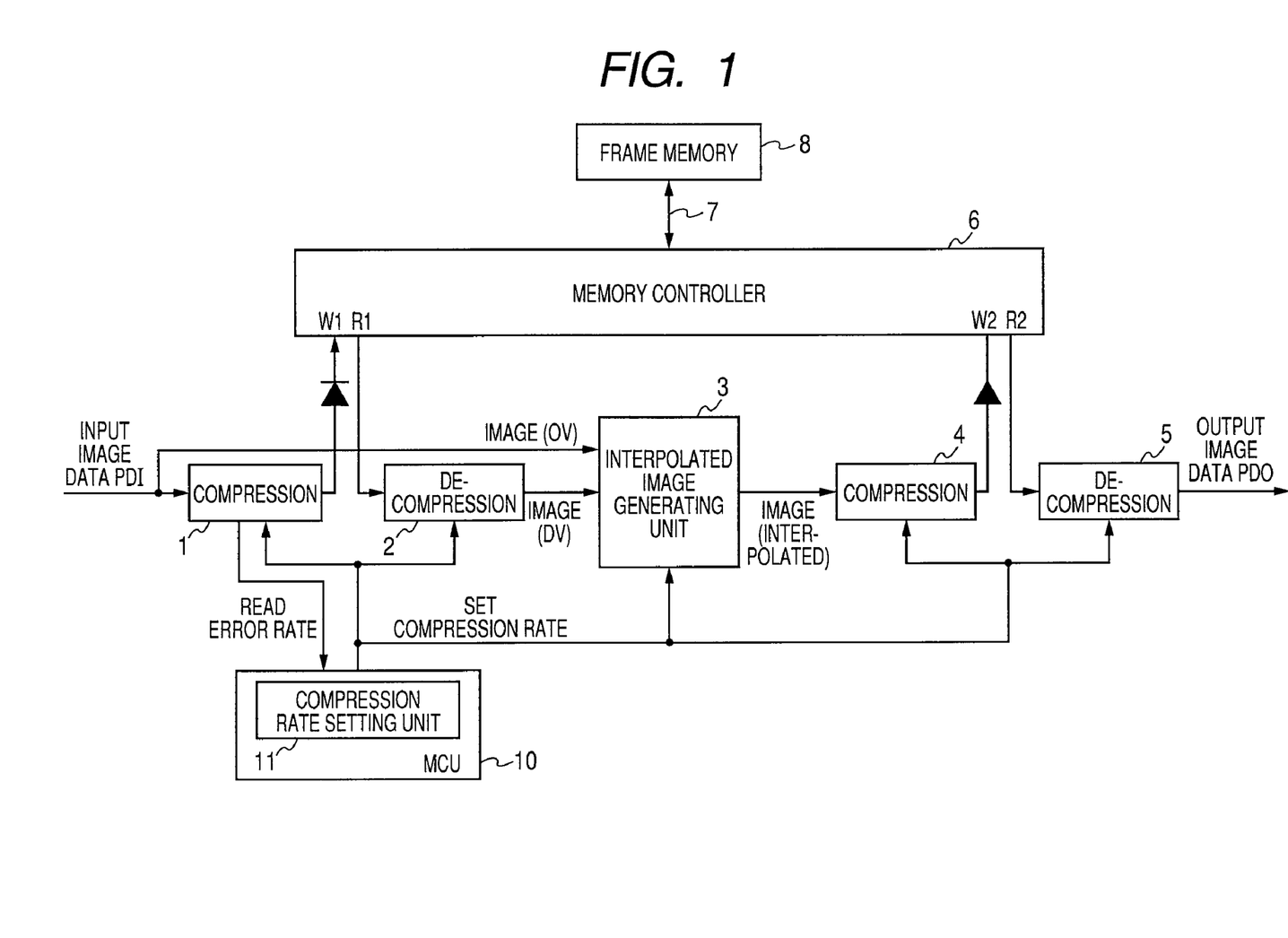
FIG. 1 is a diagram that schematically shows a configuration of an image processing apparatus according to Embodiment 1 of the invention.

[Embodiment 1] FIG. 1 is a diagram that schematically shows a configuration of an image processing apparatus according to Embodiment 1 of the invention. In FIG. 1, the image processing apparatus includes a compression unit 1 and a decompression unit 2 for compressing and decompressing input image data, an interpolated image generating unit 3 for generating an interpolated image, and a compression unit 4 and a decompression unit 5 for compressing and decompressing the interpolated image, respectively.

The compression unit 1 has a function to determine, for example, an error rate in the data amount of input image data PDI, and adaptively compresses the input image data PDI depending on the error rate (the quantity of data loss). The rate at which the compression unit 1 compresses input image data (compression rate) is variable and its compression algorithm is changed (i.e., the compression rate is changed) depending on image features of input image data PDI, such as its data amount. The decompression unit 2 decompresses the image data compressed by the compression unit 1. The compression unit 1 and the decompression unit 2 will compress and decompress input image data at a same compression/decompression rate.

The interpolated image generating unit 3 receives an input image data PDI (OV) given in the current cycle and a decompressed image data (DV) generated from the decompression unit 2 and, from these two images, generates an interpolated image by executing an interpolation processing according to a predefined rule. The interpolated image generating unit 3 may generate a frame of an intermediate image from temporally contiguous frames in a certain manner of interpolation processing. For example, such a manner of interpolation processing may be used that pixels of an interpolated frame image are generated by using average values of pixels of blocks which are regarded as closely correlative with each other in terms of motion vectors. Alternatively, average values of all pixels in these two temporally contiguous images (e.g., frames) may simply be used.

The compression unit 4 compresses an interpolated image generated by the interpolated image generating unit 3 in the same way as the compression unit 1 does. The decompression unit 5 decompresses the image compressed by the compression unit 4 in the same way as the decompression unit 2 does and generates an output image data PDO.

The image processing apparatus further includes a memory controller 6 which serves to transfer image data between one of these compression units 1 and 4, decompression units 2 and 5 and a frame memory 8. The memory controller 6 is coupled to the frame memory 8 via a memory bus 7. The frame memory 8 is, for example, a clock synchronization type DRAM (Dynamic Random Access Memory: SDRAM) and capable of high-speed data transfer in synchronization with a clock signal.

The memory controller 6 includes a write port W1 for receiving compressed data from the compression unit 1, an output port R1 for sending image data read from the frame memory 8 to the decompression unit 2, an input port W2 for receiving compressed image data from the compression unit 4, and an output port R2 for sending image data read from the frame memory 8 to the decompression unit 5.

The memory controller 6 is coupled to the frame memory 8 via one memory bus 7 and a data transfer rate is determined by the bandwidth of the memory bus 7.

A control unit (MCU: Micro Controller Unit) 10 is provided to control image processing operation of the image processing unit. The control unit 10 includes a compression rate setting unit 11. It reads information on an error rate (a quantity of data loss) derived by the compression unit 1 and sets a compression rate for the compression units 1 and 4 and the decompression units 2 and 5 according to the error rate. In a case that the error rate provided from the compression unit 1 is large, the control unit 10 disables an operation of generating an interpolated image in the interpolated image generating unit 3. In this case, original uncompressed image data (image data with a compression rate of 1) is used as an interpolated image for frame rate conversion. Thereby, it is possible to generate an interpolated image with reduced noise, even if the error rate (the quantity of data loss) is large, and thus to minimize degradation of image quality as a whole. The compression rate setting unit 11 has, for example, a table, refers to the table, based on the error rate (the quantity of data loss) information provided from the compression unit 1, reads compression rate information corresponding to the error rate, and sets the compression rate that is optimal for the error rate (the quantity of data loss).

Figure 2:
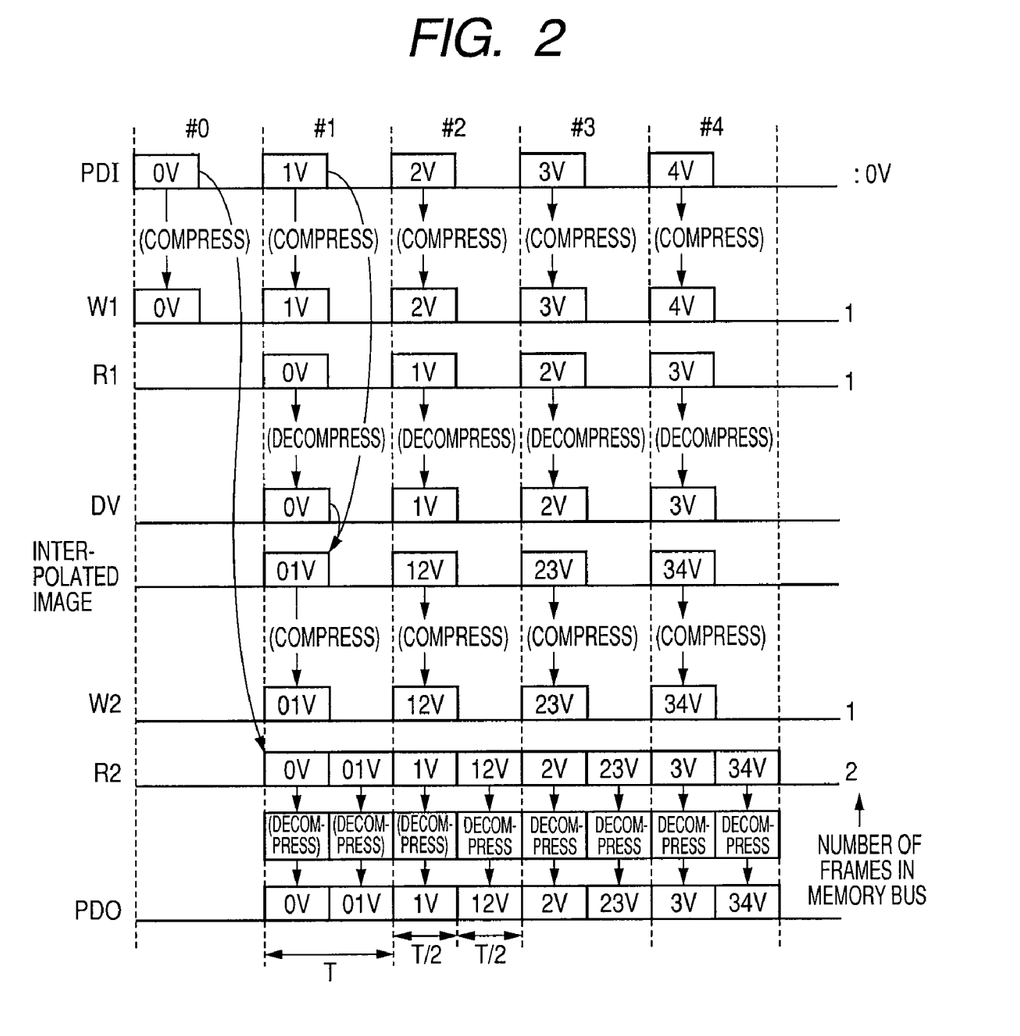
FIG. 2 is a timing chart illustrating an operation to generate an interpolated image in the image processing apparatus shown in FIG. 1.

FIG. 2 is a timing chart illustrating a sequence of generating an interpolated image in the image processing apparatus shown in FIG. 1. In the following, this operation of the image processing apparatus shown in FIG. 1 will be described with reference to FIG. 2.

Now, frame images are assumed to be images. Input image data PDI is provided from a pre-processing unit such as an image processor. The compression unit 1 receives the input image data PDI, determines, for example, the amount of the image data, and generates information on an error rate. This error rate (the quantity of data loss) may be, for example, the data size of the input image data PDI, the total sum of the values of all pixels in one frame image, or differences between adjacent pixels. This process of determining an error rate may be a process for generating information by which the amount of data after being compressed can be evaluated (estimated).

The error rate information (quantity of data loss information) determined by the compression unit 1 is provided to the compression rate setting unit 11 in the control unit 10. The compression rate setting unit 11 in the control unit 10 sets a compression rate according to the error rate information. In accordance with the thus set compression rate, the compression unit 1 compresses the input image data PDI and serially transfers compressed image data to the input port W1 of the memory controller 6.

FIG. 2 illustrates a phase in which image data 0V, 1V, 2V, 3V, 4V are sequentially provided in each vertical period (V period), that is, in cycles #0 to #4. These frame image data are serially compressed by the compression unit 1 and stored into the frame memory 8 via the input port W1 of the memory controller 6 and the memory bus 7.

In the next cycle #1, image data 1V is provided as second input image data PDI. This image data is compressed by the compression unit 1 and stored into the frame memory 8 via the memory controller 6 and the memory bus 7. This image data 1V is also provided as original image data OV to the interpolated image generating unit 3. In this cycle #1, moreover, image data 0V stored during cycle #0 is read from the frame memory 8 and provided to the decompression unit 2 from the output port R1 of the memory controller 6. This compressed image data 0V is decompressed by the decompression unit 2 and decompressed image data DV is generated.

The interpolated image generating unit 3 receives these image data OV and DV, executes predefined interpolation processing, and generates an interpolated image 01V. The interpolation processing that is executed by the interpolated image generating unit 3 may be a processing in which, from temporally contiguous frame images 0V and 1V, an interpolated frame in an intermediate position therebetween on the time axis is generated.

The interpolated image 01V generated by the interpolated image generating unit 3 is then compressed by compression unit 4 and provided to the input port W2 of the memory controller 6. The memory controller 6 stores the compressed image data provided to the input port W2 into the frame memory 8 via the memory bus 7.

Further, during this cycle #1, in a first half cycle, the memory controller 6 reads the image data (compressed image data) 0V provided in cycle #0 and provides it to the decompression unit 5. In a second half cycle, the memory controller 6 reads the interpolated image 01V generated by the interpolated image generating unit 3. These image data are decompressed by the decompression unit 5 and image data 0V and 01V are generated and output as output image data PDO.

From these two images 0V and 1V, the intermediate interpolated image 01V is generated and the number of frame images doubles. Hence, the image frequency (e.g., frame rate) is set to double.

Subsequently, also for input image data 1V, 2V, 3V and 4V provided in cycles #1 to #4, the same series of steps of compression, decompression, interpolation, compression, and decompression is performed. Output image data PDO are generated in order of input image data 1V, interpolated image data 12V, input image data 2V, and so on, and forwarded to a following stage circuit which is not shown.

In this sequence of frame image data, the number of output image frames becomes two times the number of input frame images, thus enabling a double speed display. Therefore, if the frame rate fps is, for example, 60 fps, an image display at 120 pfs is possible. This can prevent decreased response speed of images displayed on a liquid crystal display and also can reduce a sense of persistence of vision and minimize degradation of image quality by shortening the hold time.

When the compression and decompression are performed, it is required that five frames (image data is considered as frame images) are transferred over the memory bus 7 during one vertical period T. That is, one frame of image data should be transferred via the input ports W1 and W2 and the output port R1, respectively, and two frames (original image frame data and interpolated frame image data) should be read via the readout port R2. Hence, a total of five frames of image data need to be transferred during one vertical period T.

Figure 3:
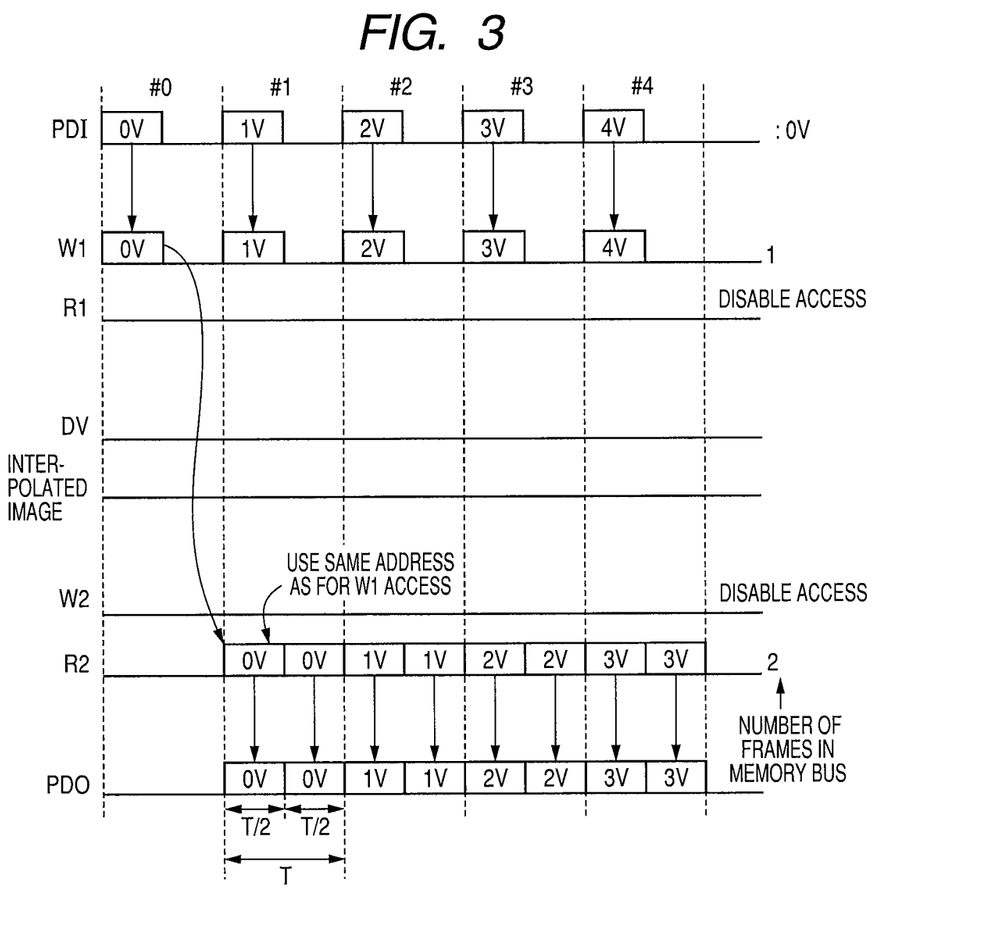
FIG. 3 is a timing chart illustrating an operation not to generate an interpolated image in the image processing apparatus shown in FIG. 1.

FIG. 3 illustrates a processing sequence in a case where the error rate information generated by the compression unit 1 indicates a large error rate and a subsequent decompressed image is likely to have a large noise. In the following, referring to FIG. 3, a description will be provided for the processing sequence in the case where a compressed image is anticipated to be noisy (an image with a large quantity of data loss) in the image processing apparatus shown in FIG. 1.

In cycle #0, frame image data 0V is provided as input image data PDI. The compression unit 1, for example, prescans this input image data PDI and determines an error rate (a quantity of data loss). According to the error rate information (quantity of data loss information) provided from the compression unit 1, the control unit 10 (the compression rate setting unit 11) anticipates that a noisy image will be generated by compression processing, if executed, and sets a compression rate of 1 for image data 0V. The compression unit 1 performs no compression processing with the compression rate of 1 from the control unit 10. That is, it does not compress the input image data PDI and provides this data as is to the input port W1 of the memory controller 6.

According to the indication of the compression rate of 1 (indicating that no compression is performed or that compression is disabled), the interpolated image generating unit 3 disables the operation of generating an interpolated image. At this time, the memory controller 6 disables write/read operation on data for generating an interpolated image, according to no compression indication, i.e., the compression rate information specifying the compression rate of 1 from the control unit 10. Therefore, when frame image data 1V is provided as input image data PDI in clock cycle #1, the memory controller 6 reads the frame image data 0V twice in T/2 cycles and provides the two image data 0V to the decompression unit 5 from its output port R2. Because of the compression rate of 1, the decompression unit 5 does not decompress the data and only forwards the provided image data, thus generating output image data PDO.

Subsequently, in each cycle #1, #2, #3 and #4, each frame image data 1V, 2V, 3V, 4V is not compressed and these data are only transferred to the frame memory 8 via the memory bus 7. In this case, therefore, three frames of image data are transferred over the memory bus 7 during one vertical period T.

In the case that the error rate is large, no compression processing (compression processing with the compression rate of 1) is performed and original image data is used as an interpolated image (interpolated frame image data). This can prevent noise due to compression processing and can minimize degradation of image quality.

Figure 4:
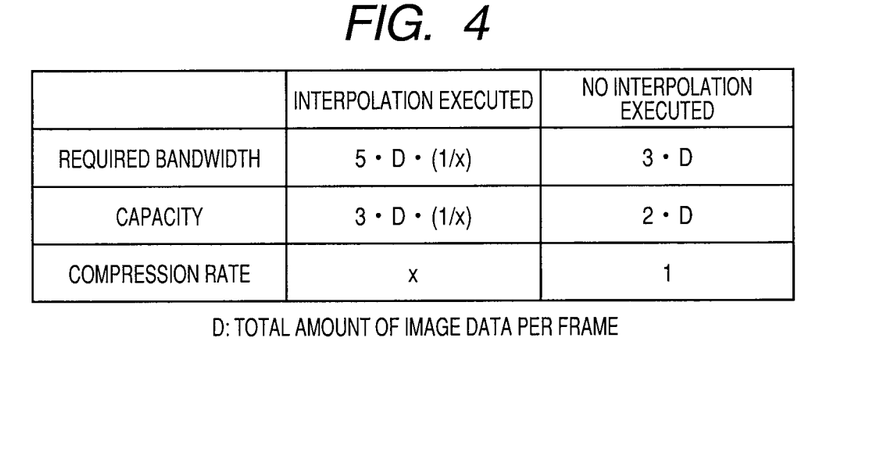
FIG. 4 is a table listing correlations of the bandwidth and storage capacity of the frame memory in the image processing apparatus shown in FIG. 1 with compression rate.

FIG. 4 is a table listing correlations of the bandwidth of the memory bus 7, compression rate and required storage capacity in relation to the case where interpolation is executed and the case where no interpolation is executed.

When interpolation processing is executed, five frames of images are transferred over the memory bus 7 and, therefore, a bandwidth of $5 \cdot D \cdot (1/X)$ bits is required. Here, D denotes the amount of image data per frame and X denotes a compression rate. T is one vertical period. Two frames of image data which are necessary for interpolation processing and a generated interpolated frame image need to be stored in the frame memory 8. As its storage capacity, a capacity of $3 \cdot D \cdot (1/X)$ bits is required.

On the other hand, when the compression rate is 1 and no interpolation processing is executed, three frames of image data are transferred over the memory bus 7 during one vertical period and, therefore, the required bandwidth is $3 \cdot D$ bits/T. In this case, two frames of image data only need to be stored in the frame memory 8 and a storage capacity of $2 \cdot D$ bits is required. Accordingly, if such compression scheme is applied, the required bandwidth and storage capacity can be reduced (typically, a compression rate equals to a value between 1.5 and 2.0).

Figure 5:
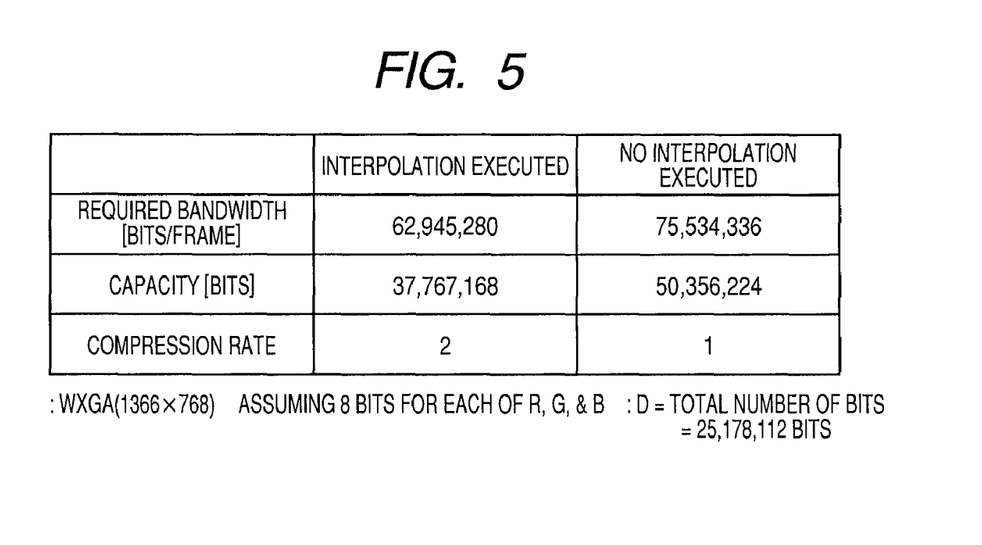
FIG. 5 is a table listing exemplary values of the bandwidth, storage capacity and compression rate given in FIG. 4.

FIG. 5 is a table listing exemplary values of required bandwidth and storage capacity in a case where a frame image is WXGA (Wide XGA: 1366×768 bits) and R (Red), G (Green) and B (Blue) are represented in 8 bits, respectively. In this case, a total number of bits per frame D is 25,178,112 bits. It is assumed that a compression rate of 2 is set. Under this condition, when interpolation processing is executed, the required bandwidth (the number of bits to be transferred during one vertical period) is 62,945,280 bits and the required storage capacity of the frame memory is 37,767,168 bits.

On the other hand, when the compression rate is 1 and no interpolation processing is executed, the required bandwidth is 75,534,336 bits and the required storage capacity of the frame memory is 50,356,224 bits. Hence, by choosing a frame memory whose specifications meet the conditions of both cases where interpolation is executed and where no interpolation is executed, processing changeover can be performed using the same frame memory, depending on the error rate (quantity of data loss) when image data is compressed.

By way of example, FIG. 5 assumes a case where the resolution is WXGA and the aspect ratio of the screen is 16:9. However, the aspect ratio of the screen may be 16:10 or 5:3. Pixels in one frame are 1280×800 dots in the former case and 1024×768 dots in the latter case.

Figure 6:
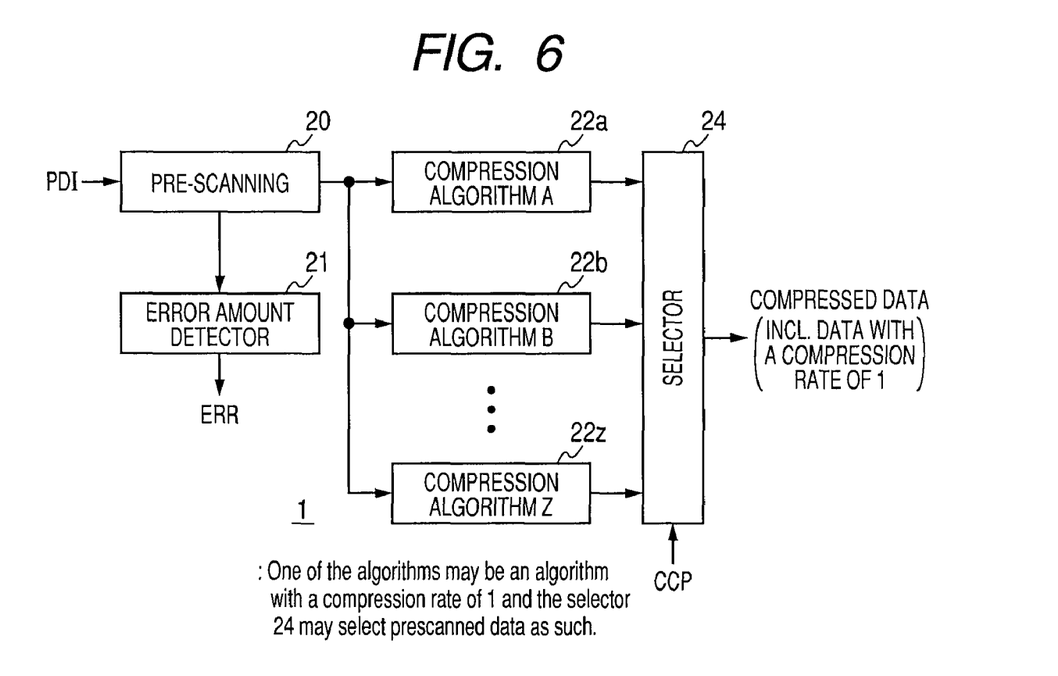
FIG. 6 is a diagram that schematically shows a configuration example of a compression unit shown in FIG. 1.

FIG. 6 is a diagram that schematically shows a configuration example of the compression unit 1 shown in FIG. 1. In FIG. 6, the compression unit 1 includes a pre-scanning unit 20 which pre-scans input image data PDI, compression processing units 22a-22z which compress the image data pre-scanned by the pre-scanning unit 20, and a selector 24 which selects one of compressed data output by the compression processing units 22a-22z, according to compression rate setting information CCP.

The pre-scanning unit 20 serially scans input image data PDI and derives data for all pixels. The compression processing units 22a-22z executes compression processing on image data from the pre-scanning unit 20 in accordance with compression algorithms A-Z which differ from one another. The compression rates of the compression algorithms A-Z to be executed by these compression processing units 22a-22z differ from one another. Among these compression processing units 22a-22z, there may be a compression processing unit for compression processing at a compression rate of 1.

The compression unit 1 further includes an error amount detector 21 which receives the image data pre-scanned by the pre-scanning unit 20 and generates error amount (quantity of data loss) information. The error amount detector 21 derives the size of the data (e.g., the number of data bits) for the pixels pre-scanned by the pre-scanning unit 20 or information indicative of image features such as differences between adjacent pixels and generates error rate information ERR according to the derived data value. For example, the error amount detector 21 compares the derived value indicative of image features such as data size with a predetermined threshold value (threshold values) to determine a error amount level and generates error rate information ERR indicating the error rate (the quantity of data loss) according to the result (error amount level) of the comparison.

The compression algorithms A-Z in the compression processing units 22a-22z have different compression rates. As the compression algorithms with different compression rates, for example, the following compression algorithms may be used: algorithms that have different quantization steps, an algorithm using run-length coding, an algorithm using variable length coding, etc. As can be seen in FIG. 6, these compression processing units 22a-22z operate in parallel and, respectively, execute their compression processing on the image data pre-scanned by the pre-scanning unit 20. In this case, the compression processing units 22a-22z may be configured such that, according to compression rate information from the control unit, a compression processing unit that executes a compression algorithm predefined for the specified compression rate only executes its compression processing. By means of the selector 24, by selecting compressed data from a compression processing unit responsible for the corresponding compression rate in accordance with the compression rate information CCP, desired compressed data can be generated and the compression rate can be changed adaptively. In this case, one of the compression processing units 22a-22z may execute compression processing at a compression rate of 1 and output data from this compression processing unit for the compression rate of 1 may be selected by the selector 24, when compression processing is disabled. Alternatively, the selector 24 may be configured to select pre-scanned data from the pre-scanning unit 20, if the compression rate of 1 is determined.

Figure 7:
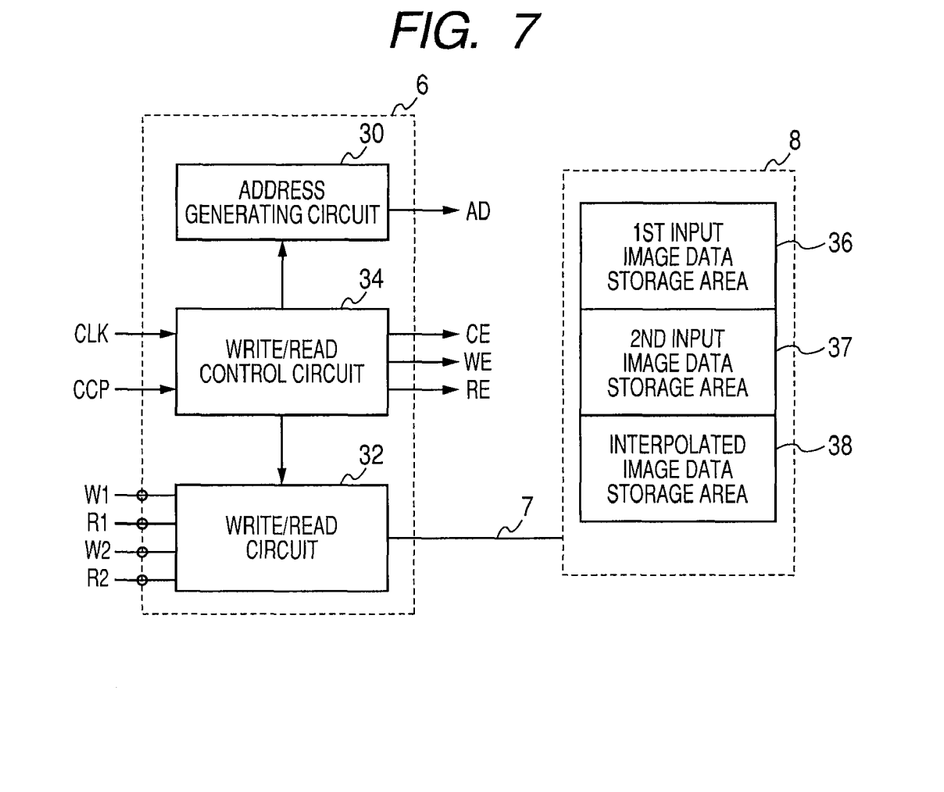
FIG. 7 is a diagram that schematically shows a configuration example of a memory controller and a frame memory shown in FIG. 1.

FIG. 7 is a diagram that schematically shows a configuration example of the memory controller 6 and the frame memory 8 shown in FIG. 1. In FIG. 7, the memory controller 6 includes an address generating circuit 30 which generates an address to be accessed in the frame memory 8, a write/read circuit 32 for image data transfer to/from the frame memory, and a write/read control circuit 34 which controls the operation of the write/read circuit 32.

The write/read control circuit 34 operates in synchronization with a clock signal CLK and controls the operations of the address generating circuit 30 and the write/read circuit 32 in accordance with compression rate information from the control unit (the compression rate setting unit 11) shown in FIG. 1. Further, the control circuit 34 generates access control signals CE, WE and RE for access to the frame memory. A control signal CE is a chip enable signal to specify execution of access to the frame memory. A control signal WE is a write enable signal to specify data writing to the frame memory. A control signal RE is a read enable signal to specify data reading from the frame memory. These address signal AD and control signals CE, WE, RE are transferred to the frame memory 8 via a memory address control bus which is not shown.

The write/read circuit 32 is coupled to the frame memory 8 via the memory bus 7. Under the control of the write/read control circuit 34, the write/read circuit 32 executes data transfer between any one of the ports W1, R1, W2 and R2 and the memory bus 7.

The frame memory 8 includes a first input image data storage area 36, a second input image data storage area 37, and an interpolated image storage area 38. In the input image storage areas 36 and 37, compressed or uncompressed input image data are stored. In the interpolated image storage area 38, an interpolated image generated by the interpolated image generating unit is stored.

When interpolation processing is executed, input image data in the current cycle is written into the first input image storage area 36 and input image data in the previous cycle is read from the second input image storage area 37. Interpolation processing is executed using these image data in the current and previous cycles and a generated interpolated image is stored into the interpolated image storage area 38.

In parallel with the generation of an interpolated image, the image data in the previous cycle is read from the second image data storage area 37, the generated interpolated image data is then read from the interpolated image storage area 38, and output image data are generated. Therefore, during data writing into the first image data storage area 36, data reading from the second image data storage area is performed. From the image data storage area into which writing has been completed, reading is performed in turn.

When no interpolation processing is executed and no interpolated image is generated, the first and second image data storage areas 36 and 37 are used, but the interpolated image storage area 38 is not used. Writing into and reading from the first and second image data storage areas 36 and 37 are performed alternately. To generate output image data, image data reading from the same image data storage area is continuously performed.

When the compression rate information CCP indicates a compression rate other than 1, the write/read control circuit 34 controls the operations of the address generating circuit 30 and the write/read circuit 32 and generates the control signals CE, WE and RE, so that five frames will be transferred over the memory bus 7 during one vertical period, that is, the image data storage areas 36, 37 and 38 will be accessed sequentially. On the other hand, when the compression rate information CCP indicates a compression rate of 1, the write/read control circuit 34 controls the operations of the address generating circuit 30 and the write/read circuit 32 and generates the control signals CE, WE and RE, so that three frames of image data will be transferred over the memory bus 7 during one vertical period, that is, the input image data storage areas 36 and 37 will be accessed alternately.

That is, when frame interpolation processing is executed, i.e., compression processing is executed, the write/read circuit 32 selects the ports W1, R1, W2 and R2 sequentially in a predetermined sequence and executes data transfer between the selected port and the memory bus 7. Thereby, the write/read circuit 32 accesses the image data storage areas 36, 37 and 38 of the frame memory 8 sequentially and executes writing and reading of image data, so that no collision of image data occurs in the memory bus 7.

On the other hand, if the compression rate is 1, the write/read circuit 32 executes data transfer between either of the write port W1 and the read port R2 and the memory bus 7. Thereby, the write/read circuit 32 accesses the input image data storage areas 36 and 37 of the frame memory 8 alternately. During a period of access to either of the ports R1 and W2, the memory controller 6 disables access to the frame memory 8 and address generation. When image data is transferred to the port R2, the address generating circuit 30 is triggered to generate an address for data writing from the port W1. Accordingly, frame memory access sequence when generating an intermediate interpolated frame image and when not generating it can be set differently in accordance with the compression rate information CCP.

As described hereinbefore, according to Embodiment 1 of the invention, the compression rate is changed depending on features of input image data (such as data amount) and, if it is determined that the error rate (the quantity of data loss) becomes large by compressing the image, generation of an interpolated image is disabled. Therefore, changeover between no compression processing and compression processing can be performed using the same frame memory and adaptive compression processing depending on image features can be implemented. Because no interpolated image is generated in the case of a high error rate, it is possible to avoid errors in an interpolated image and improve an overall image quality.

As image data, frame data is used. However, filed data may be used as image data. Two or more interpolated images may be generated. This implies that at least one interpolated image is generated from a plurality of images. If a plurality of interpolated images, e.g., two interpolated images #01aV and #01bV are generated during cycles #0 and #1, it is conceivable that an interpolated image #01aV is generated with a low error rate, whereas an interpolated image #01bV is generated with a high error rate. In such a case, if an input image in cycle #0 is used as a source image for interpolation for the interpolated image #01bV, an image that appears to move back might be generated. To avoid generating such an image, it will be expedient to use an interpolated image #01a as a source image for interpolation when generating the interpolated image #01bV. If a high error rate has already been detected when generating the interpolated image #01aV, it goes without saying that the input image in cycle #0 should be used instead of the interpolated images #01aV and #01bV.

Figure 8:
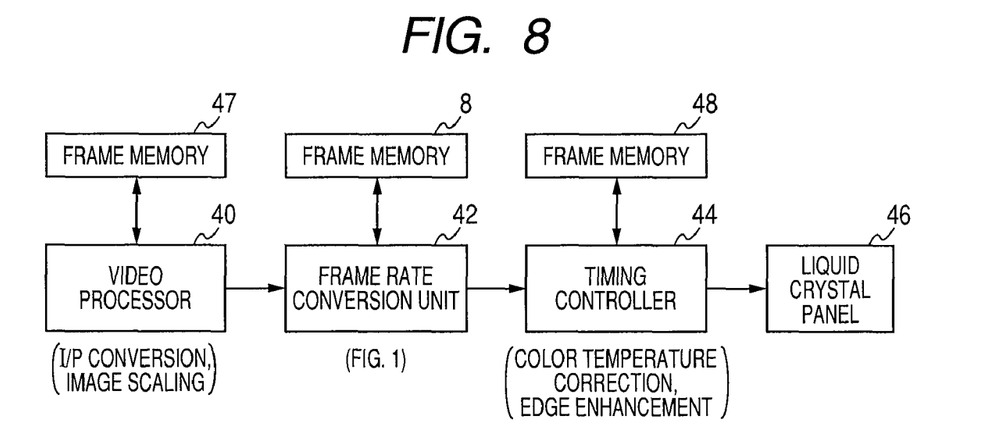
FIG. 8 is a diagram that schematically shows an overall configuration of an image processing apparatus according to Embodiment 2 of the invention.

[Embodiment 2] FIG. 8 is a diagram that schematically shows an overall configuration of an image processing apparatus according to Embodiment 2 of the invention. In FIG. 8, the image processing apparatus generates image data to be delivered to a liquid crystal panel 46. this image processing apparatus includes a video processor 40, a frame rate conversion unit 42 which coverts the frame rate of image data from the video processor 40, and a timing controller 44 which generates image data for driving the liquid crystal panel 46 from the image data from the frame rate conversion unit 42.

Frame memories 46 and 48 are provided, respectively, for the video processor 40 and for the timing controller 44. These frame memories 46 and 48 are used for temporary storage of image data by the video processor 40 and the timing controller 44, respectively.

Using the frame memory 46 as a working area, the video processor 40 performs I/P conversion processing to convert interlaced frames of image data into a progressive image data stream, image scaling up/down, and other processing. The video processor 40 has a motion detector to detect image motion for two to five frames and executes the I/P conversion processing depending on the motion for these multiple frames.

The frame rate conversion unit 42 and the frame memory 8, which are the same as illustrated in the configuration of the image processing apparatus according to Embodiment 1 shown in FIG. 1, selectively carry out frame interpolation according to an error rate.

Using the frame memory 48 as a working area for storing image data, the timing controller 44 performs color temperature correction and edge enhancement processing to improve the response performance of the liquid crystal panel 46. The timing controller 44 has a detector to detect image motion for two frames and executes frame processing (edge enhancement processing) depending on the image motion, thus minimizing image degradation attributed to the response performance of the liquid crystal panel (enhancing the image portions in the frame boundaries at which the image changes to reduce deviation from an ideal response waveform).

In the configuration shown in FIG. 8, the video processor 40, the frame rate conversion unit 42 and the timing controller 44 may be formed respectively in separate semiconductor chips. The frame conversion unit 42 and the video processor 40 may be formed on one semiconductor chip 3 as a single video processor IC or may be disposed in a same package. Alternatively, the frame rate conversion unit 42 and the timing controller 44 may be integrated on one semiconductor chip as a timing controller IC or may be disposed in a same package. In each case, by using the frame rate conversion unit 42 which carries out frame rate conversion processing in accordance with Embodiment 1 of the invention in conjunction with the frame memory 8, it is possible to minimize degradation of images displayed on the liquid crystal display when driving the liquid crystal panel 46 and to provide high quality images by simple circuit configuration.

As described hereinbefore, according to Embodiment 2 of the invention, the video processor or the timing controller equipped with the frame rate conversion unit is implemented in a single chip and it is thus possible to display images without degradation of image quality.

In the above description, the frame rate conversion (frame interpolation) of frame images is carried out. However, the image data may be interlaced image data wherein one frame typically comprises two fields. That is, essentially, the invention allows for any configuration in which the image display rate is converted by generating an intermediate image from a plurality of images. In other words, the frame rate conversion unit (image processing apparatus) of the present invention can be applied to any configuration in which a new image is created by comparing a plurality of images.

The display device for which the invention is advantageously used is not limited to the liquid crystal display and may be any other display device.

The invention is generally applicable to a unit adapted to execute processing to generate an intermediate image from a plurality of images. The invention is also applicable to a frame image rate conversion unit incorporated in an image processing system or an image rate conversion unit formed on a single chip.

What is claimed is:

1. An image processing apparatus comprising:
a memory;
a memory controller which controls writing and reading of image data to/from the memory;
a first compression unit which includes an error amount detector which derives image features from input image data and determines an error rate when compressing the image depending on the derived image features, executes compression processing on the input image data according to a compression rate which has been set, and stores the resulting compressed image data into the memory via the memory controller;
a first decompression unit which executes decompression processing on the compressed image data which has been read from the memory by the memory controller according to the compression rate which has been set, thus generating image data;
an interpolated image generating unit which executes interpolation processing on the input image data and the image data from the first decompression unit, thus generating an interpolated image;
a second compression unit which compresses the interpolated image at the compression rate which has been set and stores the compressed image data into the memory via the memory controller;
a second decompression unit which decompresses the image data which has been read from the memory via the memory controller, thus generating output image data; and
a control unit including a compression rate setting unit which sets the compression rate depending on the error rate determined by the error amount detector, wherein
the control unit identifies an error state based on error rate information determined by the error amount detector, and based the identified error state, disables image compression at a compression rate other than 1 by the first compression unit, image decompression by the first decompression unit, interpolation by the interpolated image generating unit, and image compression by the second compression unit, and
the memory controller, when the interpolation is disabled by the control unit, reads the image data generated and stored by the first compression unit from the memory, instead of interpolated image data to be provided to the second decompression unit.

2. The image processing apparatus according to claim 1, further comprising a video processor which performs necessary pre-processing for display on image data and generates the input image data.

3. The image processing apparatus according to claim 1, further comprising a timing controller which performs necessary post-processing for driving a display device on output image data from the second decompression unit.

* * * * *